May 26, 1964
L. G. BERGMAN
3,134,221
COUPLING
Filed March 9, 1962
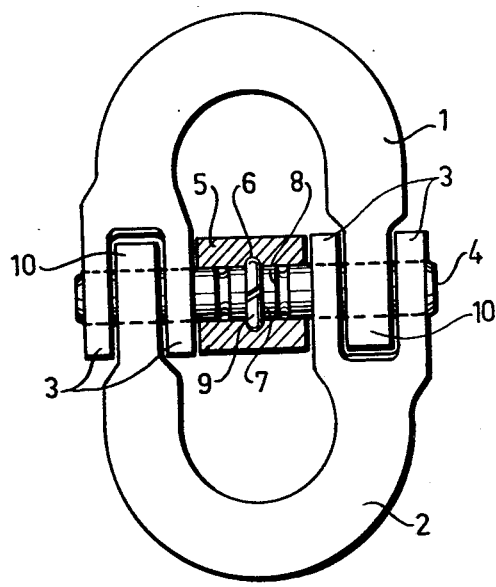
Inventor
Lars Gunnar Bergman
By Pierce, Scheffler & Parker
Attorneys

3,134,221
COUPLING
Lars Gunnar Bergman, Vallingby, Sweden, assignor to Jarnbirger Aktiebolag, Falun, Sweden, a company of Sweden
Filed Mar. 9, 1962, Ser. No. 178,634
1 Claim. (Cl. 59—85)

This invention relates to a coupling for the linking of chains, wires and similar objects, including two links, which are arranged to be joined by a pin through holes in the legs of the half links. The pin is kept in desired position by a socket which, preferably after the links have been arranged with the holes in their legs registering with each other and before the pin has been introduced through these holes, is placed in the space between said legs, whereafter the pin is introduced through the duct formed by said holes and said socket.

When using couplings of this type, it is known to jam the socket on the pin with the aid of stop screws, pins or similar means. Further, it is known to make the hole through the socket with a somewhat smaller diameter than that of the holes in the legs of the half links and that of the pin; in this case however the pin must be driven into the socket, e.g. with the aid of a hammer.

These known procedures of jamming the socket on the pin to hinder the pin from inadvertently disengaging from its joint involve certain disadvantages. When using stop screws, pins and similar means, special tools are needed for the jamming and the release and furthermore, said parts are easily damaged by the rough handling to which the links often are exposed. When using sockets, into which the pin must be driven, one may if full safety shall be maintained, use a socket and a pin only once, i.e. if the pin is driven out in order to disengage the linking, one cannot usually use the same pin and the same socket again and hence a new pin and a new socket must be used.

This invention has the purpose to eliminate all said disadvantages, and this is attained by a spring means enclosed in the socket. Said spring means keeps safely the pin in position and when disengaging the linking, one only needs, with the aid of a hammer or another equally simple tool, to drive the pin out of the linking, and the pin as well as the socket can without disadvantage be used repeatedly, because they are not damaged, neither when the pin is driven into the coupling nor when it is removed from it.

The invention is illustrated on the accompanying drawing, on which the coupling is shown in the assembled condition.

The coupling shown on the drawing, consists of two links 1 and 2, which are joined with the aid of a pin 4, extending through holes in the legs of the links. Between these legs is a socket 5 enclosing the middle portion of the pin 4. The two links 1 and 2 can be turned round the pin 4 independently of each other. The socket 5 keeps the pin in the shown position by a spring means 9, arranged inside the socket 5 in the groove 6. On each side of a groove 7 in the pin 4, said groove engaging the spring means 9, is one additional groove 8. The purpose of these grooves will be explained below.

If the links 1 and 2 are made identically alike, as is shown in FIGURE 1, one can manufacture them in the same machine, with the effect that the costs of manufacturing are reduced. By making the one leg of the links split 3, so that the second leg 10 of the other link can be fixed therein, as is evident from the figure, the two links are secured against lateral movement relative to each other.

The pin 4 and the socket 5 are suitably made with a good fit to each other. The grooves 7 and 8 of the pin can be made by turning or depression. By making the grooves with a suitable slope one can obtain the desired degree of hold of the pin by the spring means 9. By arranging, as has been mentioned above, at least one groove 8 on each side of the main groove 7, a very effective safety device is attained. If the pin is unintentionally exposed to an axial force so that the spring means disengages the main groove, the movement of the pin is stopped when the spring means engages one of the side or auxiliary grooves. In this position one end of the pin will protrude from the coupling more than is normal and this is easily observed by the operator, who can re-insert the pin into its normal position. During practical use this has proved to be a valuable assurance against accidents caused by unintentional loosening of the coupling.

The pin 4 is preferably made of hard steel and is provided with bevelled ends. The socket 5 is provided with a cavity 6 for the spring means 9, which suitably is a circlip or the like. The grooves of the pin are shaped in conformity with the cross-sectional shape of the circlip. The side walls of the grooves shall preferably be comparatively steep, so that the pin is held by the spring means in a powerful grip. Of course more than one spring means can be arranged in the socket.

The cavity 6 for the spring means 9 is preferably placed in the middle portion of the socket.

In order to indicate the position of the circlip and the best direction of movement of the pin when the coupling is assembled and disassembled, the socket may be provided with a suitable marking.

The links and the pin shall be made of high quality steel hardened to high toughness.

What I claim is:

A coupling for the joining of links, wires and similar objects, including two links joined by a pin situated in holes in the legs of the links and secured in this position by a socket situated between the said legs and containing an annular spring means engaging a locking groove in the pin and extending around the entire periphery of the pin, characterized in that the pin is provided with means for safe guarding the coupling against accidental separation consisting of at least one safety groove on each side of said locking groove which the said spring means engages when the pin is in its normal position, the axial distance between said locking groove and each of said safety grooves being less than the distance between either end of said pin and the nearest inner surface of said legs.

References Cited in the file of this patent
UNITED STATES PATENTS

| | | |
|---|---|---|
| 1,464,386 | Ingram | Aug. 7, 1923 |
| 1,513,729 | Adams | Nov. 4, 1924 |
| 1,784,451 | Kraemer | Dec. 9, 1930 |
| 1,862,337 | Emrick | June 7, 1932 |
| 2,571,563 | Bastien | Oct. 16, 1951 |
| 2,623,399 | Barrett | Dec. 30, 1952 |
| 2,648,989 | Cordis | Aug. 18, 1953 |
| 2,790,024 | Fulmer | Apr. 23, 1957 |
| 2,824,772 | Petersen | Feb. 25, 1958 |
| 2,972,223 | Devonshire | Feb. 21, 1961 |